(12) United States Patent
Kushima

(10) Patent No.: US 7,865,214 B2
(45) Date of Patent: *Jan. 4, 2011

(54) RADIO COMMUNICATION TERMINAL, RADIO COMMUNICATION TERMINAL HOUSING CASE, RADIO COMMUNICATION TERMINAL SHEET AND RADIO COMMUNICATION TERMINAL DISPLAY DEVICE

(75) Inventor: Hidekiyo Kushima, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 12/210,544

(22) Filed: Sep. 15, 2008

(65) Prior Publication Data

US 2009/0017882 A1 Jan. 15, 2009

Related U.S. Application Data

(63) Continuation of application No. 11/222,846, filed on Sep. 12, 2005, now abandoned.

(51) Int. Cl.
*H04M 1/00* (2006.01)
(52) U.S. Cl. .................. 455/562.1; 455/41.1; 455/41.2; 455/575.3; 455/575.5; 455/90.3; 455/550.1; 340/572.7; 340/572.1; 340/572.4; 340/572.6; 235/492; 343/702; 343/866

(58) Field of Classification Search ................ 455/90.3, 455/575, 550, 575.3, 575.5, 562.1, 550.1; 340/572.7, 572.1, 572.4, 572.6; 235/492; 343/702, 866
See application file for complete search history.

(56) References Cited

U.S. PATENT DOCUMENTS

| 6,011,519 | A  | * | 1/2000 | Sadler et al. ................. 343/742 |
| 6,442,399 | B1 | * | 8/2002 | Tsuru et al. ............... 455/575.7 |
| 6,963,310 | B2 | * | 11/2005 | Horita et al. ................. 343/702 |
| 7,000,837 | B2 | * | 2/2006 | Akiho et al. ................. 235/451 |
| 7,050,007 | B2 | * | 5/2006 | Akiho et al. ................. 343/702 |

(Continued)

FOREIGN PATENT DOCUMENTS

EP    1 408 580 A2    4/2004

(Continued)

*Primary Examiner*—Matthew D Anderson
*Assistant Examiner*—April G Gonzales
(74) *Attorney, Agent, or Firm*—Pillsbury Winthrop Shaw Pittman, LLP

(57) ABSTRACT

A radio communication terminal of one example of the present invention is a radio communication terminal provided with an electronic device shielded to prevent electromagnetic interference, in a housing, and comprises an integrated circuit, a first resonant circuit for making non-contact communication with an external device, and a second resonant circuit resonating with the first resonant circuit.

10 Claims, 8 Drawing Sheets

U.S. PATENT DOCUMENTS

| | | | |
|---|---|---|---|
| 7,076,858 B2 * | 7/2006 | Eckstein et al. | 29/593 |
| 7,198,198 B2 * | 4/2007 | Akiho et al. | 235/492 |
| 7,212,124 B2 * | 5/2007 | Ohkawa et al. | 340/572.7 |
| 7,232,068 B2 * | 6/2007 | Uchiyama et al. | 235/451 |
| 7,259,672 B2 * | 8/2007 | Takei | 340/572.1 |
| 7,315,290 B2 * | 1/2008 | Harada et al. | 343/866 |
| 7,333,786 B2 * | 2/2008 | Kikuchi et al. | 455/130 |
| 2002/0162894 A1 | 11/2002 | Kuramochi | |
| 2002/0183094 A1 * | 12/2002 | Seita | 455/558 |
| 2003/0045246 A1 * | 3/2003 | Lee et al. | 455/90 |
| 2004/0195324 A1 * | 10/2004 | Uchiyama et al. | 235/451 |
| 2005/0077076 A1 * | 4/2005 | Eckstein et al. | 174/200 |
| 2006/0192723 A1 * | 8/2006 | Harada et al. | 343/866 |

FOREIGN PATENT DOCUMENTS

| | | |
|---|---|---|
| EP | 1 439 487 | 7/2004 |
| JP | 04-036665 | 2/1992 |
| JP | 05-014230 | 1/1993 |
| JP | 06-130102 | 5/1994 |
| JP | 2000-031719 | 1/2000 |
| JP | 2000-323911 | 11/2000 |
| JP | 2001-024548 | 1/2001 |
| JP | 2001-101371 | 4/2001 |
| JP | 2001-250096 | 9/2001 |
| JP | 2001-307039 | 11/2001 |
| JP | 2003-18258 | 1/2003 |
| JP | 2003-037861 | 2/2003 |
| JP | 2003-258972 | 9/2003 |
| JP | 2003-330898 | 11/2003 |
| JP | 2004-029873 | 1/2004 |
| JP | 2004-056413 | 2/2004 |
| JP | 2004-096622 | 3/2004 |
| JP | 2004-304634 | 10/2004 |
| WO | WO 2004/103049 | 11/2004 |

* cited by examiner

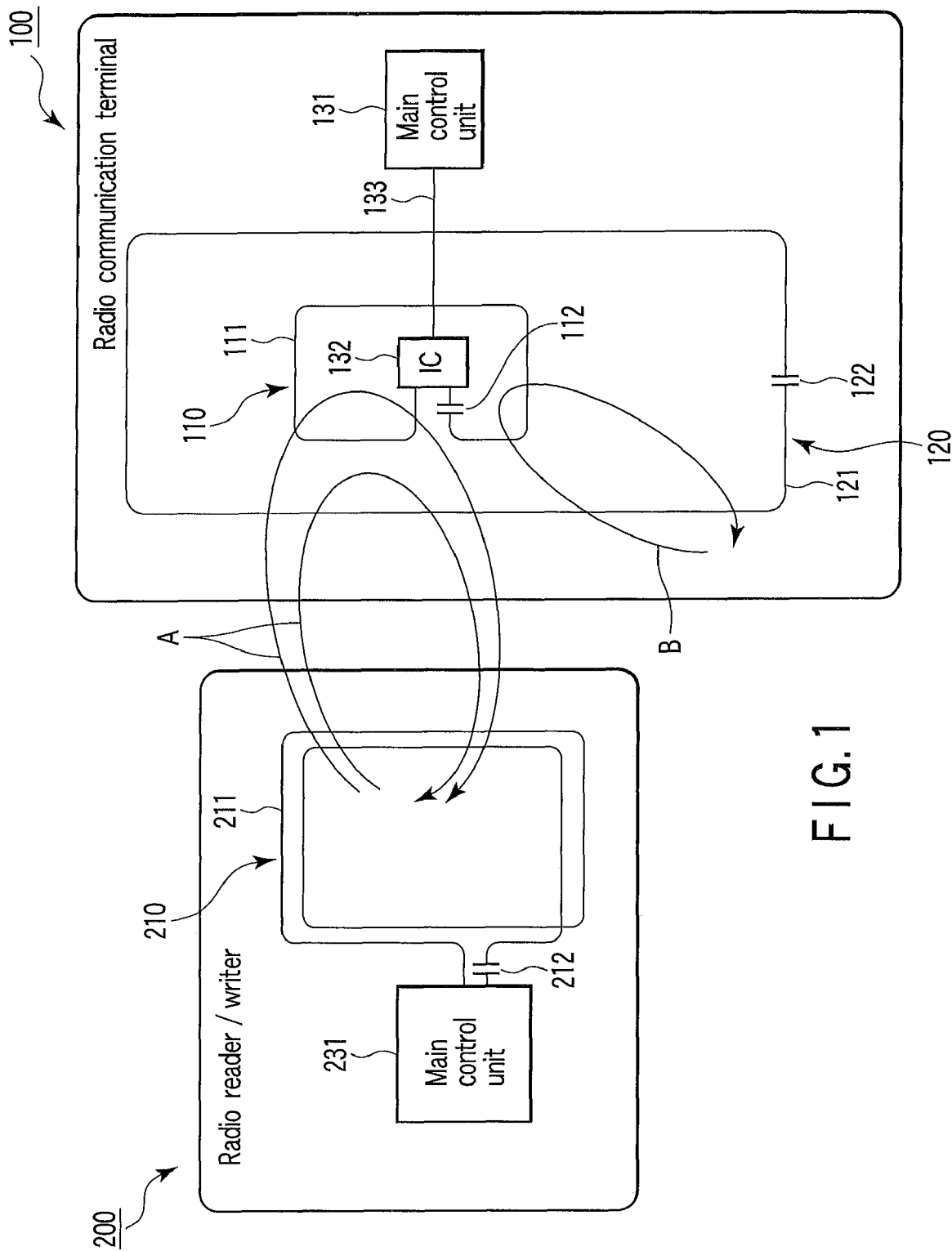
F I G. 1

Provide on either side

RADIO COMMUNICATION TERMINAL, RADIO COMMUNICATION TERMINAL HOUSING CASE, RADIO COMMUNICATION TERMINAL SHEET AND RADIO COMMUNICATION TERMINAL DISPLAY DEVICE

CROSS-REFERENCE TO RELATED APPLICATIONS

This application is a continuation of co-pending U.S. application Ser. No. 11/222,846, filed. Sep. 12, 2005, and for which priority is claimed under 35 U.S.C. §120. This application is based upon and claims the benefit of priority under 35 U.S.C. §119 from the prior Japanese Patent Application. No. 2004-246483, filed. Nov. 30, 2004, the entire contents of both applications are incorporated herein by reference in their entireties.

BACKGROUND OF THE INVENTION

1. Field of the Invention

The present invention relates to a radio communication terminal having a non-contact communication function of making radio communication using an induced magnetic field between a non-contact IC card reader/writer device (hereinafter referred to as reader/writer) by being placed in the inductive magnetic field radiated from an antenna of the reader/writer. The present invention relates to, for example, a portable phone having a non-contact IC card function used by holding it up to the antenna of the reader/writer at an automatic ticket gate installed at a ticket gate in a railroad station.

The present invention relates to a radio communication terminal housing case for housing such a radio communication terminal. The present invention relates to a radio communication terminal sheet capable of being mounted on the radio communication terminal. The present invention relates to a radio communication terminal display device capable of being mounted on the radio communication terminal.

2. Description of the Related Art

As a conventional non-contact IC card (hereinafter referred to as IC card), one which is used at the automatic ticket gate installed at the ticket gate in the railroad station is known for example. This IC card has an integrated circuit (IC) for processing a plurality of calculations and controls and has a resonant circuit for making non-contact communication with an external device, and the resonant circuit is sometimes composed of a loop coil, a capacitor and a resin material covering the IC. Such an IC card sometimes has the resonant circuit having no capacitor.

The loop coil, the capacitor and a capacitor component parasitic on or set to the connecting part of the IC compose the resonant circuit resonating with the induced magnetic field radiated from the antenna of the reader/writer on the automatic ticket gate side. This conventional IC card utilizes a voltage induced by the resonant circuit to generate operation power for the IC from a power supply circuit of a rectifying circuit, etc., of the IC and performs communication, control and data writing and reading to and from a memory.

In recent years, a variety of radio communication terminals such as a portable phone with a function owned by this type of IC card incorporated therein have been come into existence. This radio communication terminal is very small in size. Therefore, it cannot mount a loop coil with a size larger than the loop area to obtain the operation power necessary for the IC card. Accordingly, most of the IC cards are structured in which the operation power for an IC (hereinafter referred to as non-contact IC) incorporated in the communication terminal to have a function equivalent to that of the IC card and is supplied form a battery of the communication terminal and a small size of a loop coil is employed for use in communication. Since the communication terminal has electronic components and the battery to achieve a variety of terminal functions thereinside other than a communication function (phone function), it has a metal member (radio wave shielding object) to prevent the influence (noise, etc.) of the communication function onto the incorporated electronic components. Then, the communication terminal is miniaturized as mentioned above, so that there is the metal member close to or back face of the mounted loop coil for the housing of inner components in the communication terminal.

Therefore, the magnetic field radiated from the loop coil generates an eddy current on the surface of the metal member to suppress the magnetic field, so that the density of the magnetic field becomes weak as a result. To solve such a problem, a technique to make the loop coil movable and to form a gap between the loop coil and the metal member is disclosed in Jpn. Pat. Appln. KOKAI Publication No. 2003-330898.

However, other problems such that a trouble to be required to purposely move the loop coil at communication, a movable section is damaged, the cost of the communication terminal equipment is increased on ground of the mounting of the movable section, etc.

There is a method for improving the magnetic field intensity on a loop coil front face by inserting a ferrite material, etc., between the loop coil and a metal plate and securing high magnetic permeability while suppressing a magnetic loss so as to reduce the influence of the eddy current on the back face of the loop coil. Although the magnetic field intensity on the front face of the loop coil can be improved by this method, it is impossible to generate a similar magnetic field at the rear of the metal plate disposed on the back face of the loop coil.

Meanwhile, the communication though the IC card is one to demodulate variations of the introduced magnetic field radiated from the reader/writer to receive data and one in a load switching system to reply the data to the reader/writer by switching the loop coil receiving the induced magnetic field radiated from the reader/writer to vary a space impedance with the induced magnetic field related thereto and by utilizing a part of energy of the induced magnetic field.

Consequently, in the case that the front face of the loop coil mounted on the radio communication terminal is held up so as to face the antenna, the loop coil can generate an extremely strong induced power compared to the case that the back face of the loop coil is held up so as to face the antenna. As a result, this large difference in induced power comes out as a difference in a communication distance between front face holding up and back face holding up.

Therefore, the portable phone prints a mark on a housing side with the loop coil mounted thereon and displays a face to be held up toward the reader/writer. However, in the case that the portable phone is used at the automatic ticket gate installed at the ticket gate in the railroad station, wrong faces are frequently held up because passengers are in hurry, and such problems of occurrence of passage interference such as frequent closing of the ticket gate and the problem of incomplete processing such as entrance with a portable phone which is in a state of processing incompletion occur.

BRIEF SUMMARY OF THE INVENTION

An object of the present invention is to provide a radio communication terminal, a radio communication terminal housing case, a radio communication terminal sheet and a radio communication terminal display device, capable of stabilizing communication with a reader/writer.

A radio communication terminal of one example of the present invention is a radio communication terminal provided with an electronic device shielded to prevent electromagnetic interference, in a housing, comprising: an integrated circuit; a first resonant circuit connected to the integrated circuit to make non-contact communication with an external device; and a second resonant circuit resonating with the first resonant circuit.

A radio communication terminal housing case of one example of the present invention is a radio communication terminal housing case to house a radio communication terminal provided with a first resonant circuit connected to an integrated circuit to make non-contact communication with an external device, comprising: a second resonant circuit resonating with the first resonant circuit.

A radio communication terminal sheet of one example of the present invention is a radio communication terminal sheet enabled to attach to a radio communication terminal provided with a first resonant circuit connected to an integrated circuit to make non-contact communication with an external device, comprising: a second resonant circuit resonating with the first resonant circuit.

A radio communication terminal display device of one example of the present invention is a radio communication terminal display device enabled to attach a radio communication terminal provided with a first resonant circuit connected to an integrated circuit to make non-contact communication with an external device, comprising: a second resonant circuit resonating with the first resonant circuit; and light emitting means emitting light by a current induced by the second resonant circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing an example of a schematic configuration of a radio communication terminal (for example, portable phone) regarding an embodiment of the present invention and a radio reader/writer of a communication partner of the radio communication terminal;

DETAILED DESCRIPTION OF THE INVENTION

Figure 2A:
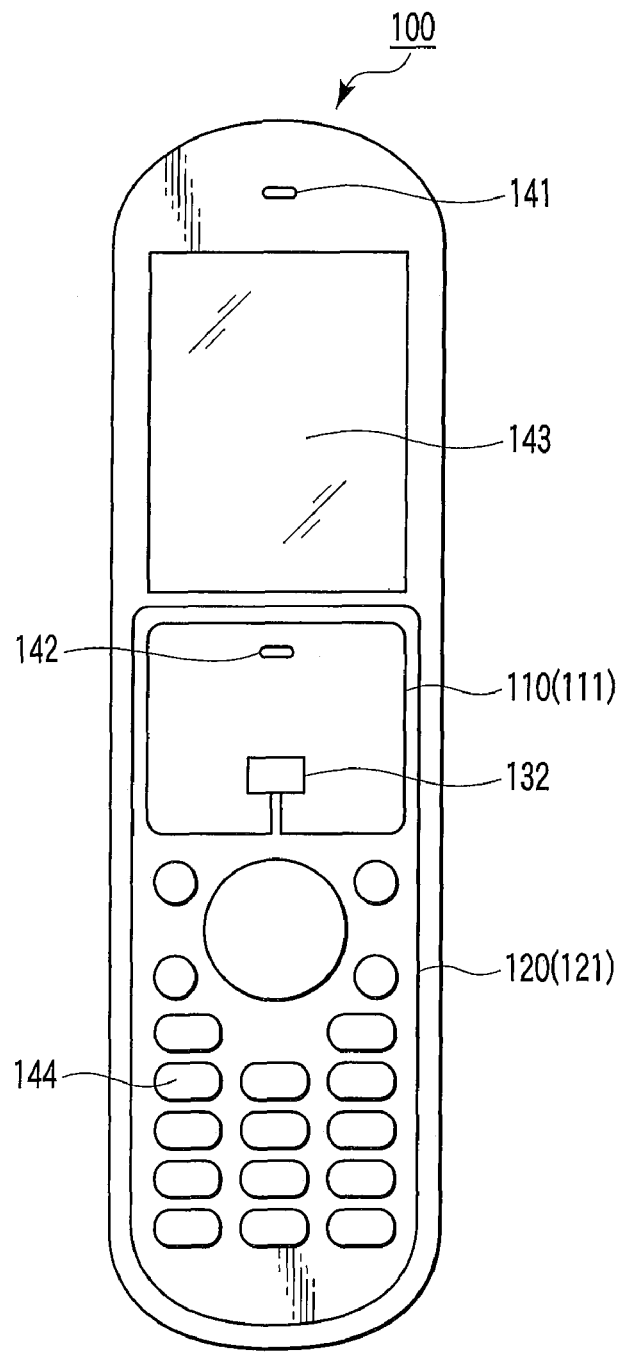
FIGS. 2A and 2B are views showing a configuration example 1 of the radio communication terminal.

Hereinafter, embodiments of the present invention will be described by referring the drawings.

FIG. 1 is the view showing the example of the schematic configuration of the radio communication terminal (for example, portable phone) regarding the embodiment of the present invention and the radio reader/writer of the communication partner of the radio communication terminal.

A radio communication terminal 100 has a communication function (phone and data communication), a plurality of inner devices/circuits (main control unit 131, etc.) achieving a variety of terminal functions and a shield for preventing electromagnetic interference of the inner devices/circuits by means of this communication function and also has a first resonant circuit 110, a second resonant circuit 120, an IC 132 (referring to as non-contact IC), a connecting line 133 and the like. The first resonant circuit 110 is composed of a first loop coil 111 and a first capacitor 112 for communication. The second resonant circuit 120 is composed of a second loop coil 121 and a second capacitor 122 for communication and is not electrically connected to the first resonant circuit.

A non-contact IC 132 is supplied operation power from a battery (battery 145 shown in FIG. 2B) and connected to the main control unit 131 through the connecting line 133. Furthermore, this non-contact IC 132 and the first loop coil 111 are connected each other.

In this embodiment, the shapes of the first loop coil 111 and the second loop coil 121 are formed in rectangular shape and wound n times, respectively. The first capacitor 112 is used for resonance adjustment of the first resonant circuit 110. In similarity, the second capacitor 122 is used for resonance adjustment of the second resonant circuit 120. The first and the second capacitors 112 and 122 are sometimes not necessary to be provided according to the resonance adjustment. For example, a substitute article for the first capacitor 112 may be disposed inside the non-contact IC 132. The first loop coil 111 and the first capacitor 112 respectively connected to this non-contact IC 132 are referred to as a non-contact IC unit.

A radio reader/writer 200 has a resonant circuit 210, a main control unit 231 and the like. The resonant circuit 210 has a loop antenna for communication 211 and a capacitor 212. The main control unit 231 has a CPU, a memory, a logic circuit and the like. Furthermore, the radio reader/writer 200 also has a radio conversion unit having a modulation circuit and a demodulation circuit. The reader/writer 200 is connected to a host device such as an automatic ticket gate installed at the ticket gate in the railroad station for example.

With the system composed of the foregoing radio communication terminal 100 and the radio reader/writer 200, data transmission and receipt by radio can be established between the radio communication terminal 100 and the radio reader/writer 200.

By using the above-mentioned system, in the case of radio communication between the non-contact IC 132 mounted on the radio communication terminal 100 and the radio reader/writer 200, the host device transmits a command to the radio reader/writer 200, the radio reader/writer 200 which has received the command from the host device converts the command into one for the non-contact IC 132 by means of the radio conversion unit to transmit it to the non-contact IC unit via the loop antenna 210.

The non-contact IC unit replies a response to the radio reader/writer 200 in response to the command received therefrom. The radio reader/writer 200 which has received the response from the non-contact IC unit converts the response from the non-contact IC unit to transmit it to the host device.

By the way, as shown in FIG. 1, if the first loop coil 111 composed of the non-contact IC unit is disposed in a magnetic field A radiated from the loop coil 211 of the radio reader/writer 200, the magnetic field radiated from the loop coil 211 of the reader/writer 200 passes through the first loop coil 111 composed of the non-contact IC unit. At this time, the non-contact IC unit receives the magnetic field which has passed though the first loop coil 111 to obtain induced power necessary for communication.

The amount of the power supplied to the non-contact IC unit varies in accordance with the intensity of the magnetic field received by the first loop coil 111 and the stronger the magnetic field intensity becomes the larger induced power can be obtained. In general, the closer the non-contact unit approaches the loop coil 211 of the radio reader/writer 200, the larger the induced power obtained from the first loop coil 111 becomes and as far as getting away from the loop coil 211, the induced power is apt to become small.

If the intensity of the magnetic field radiated from the loop coil 211 of the radio reader/writer 200 is constant, the larger electro motive force generated from the first loop coil 111 composed of the non-contact IC unit can make stable communication even if the communication distance is further long. That is, to secure stable communication performance in a long communication distance it is necessary that the induced power is large also for the communication made at the first loop coil 111 composed of the non-contact IC unit.

In the radio IC card, there is no shielding member to shield the magnetic field passing through the loop coil mounted on the radio IC card. In contrast, in the radio communication terminal 100, for example, a plurality of electronic components and batteries to achieve a phone function are incorporated therein, these electronic components and batteries are shielded so as to prevent electromagnetic interference. Otherwise stated, in the case of the radio communication terminal 100, a shielding member to shield the magnetic field passing through the first loop coil 111 is mounted thereon. Therefore, a metal object and a metal plate exist close to or back face of the first loop coil 111 composed of the non-contact IC unit mounted on the radio communication terminal 100, a wide magnetic field in a free space is not formed as an IC card and communication sensitivity is deteriorated as a result.

That is to say, since the presence of a metal just below an antenna converts the magnetic field which has passed through the antenna into an eddy current on the face of the metal, the magnetic field intensity is weakened, then, only small induced power can be generated as a result.

Therefore, in the present invention, the second loop coil 121 and the second capacitor 122 composes the second resonant circuit 120 to dispose it nearby the first loop coil 111 composing the non-contact IC unit, then, the radio communication terminal 100 can increase the induced power obtained from the first loop coil 111 composed of the non-contact IC unit. By approximating or matching the center of the first loop coil 111 to the center of the second loop coil 121, the radio communication terminal 100 can further increase the induced power generated from the first loop coil 111.

The shape of the second loop coil 121 is may be rectangular or circle for example and may be any shape. Opposed ends of the second loop coil 121 are connected to the second capacitor 122 to configure the resonant circuit. The number of windings of the second loop coil 121 and the capacity of the second capacitor 122 are set in advance to values matched to resonate with a frequency drifted from a radio communication frequency in consideration of influence of the radio communication frequency used in the system and of the surrounding metal object, etc.

As a result, when the radio communication terminal 100 is placed in the specified magnetic field, the first loop coil 111 composing the non-contact IC unit mounted nearby the second loop coil 121 and the second capacitor 122 induces the power most efficiently by re-radiating the magnetic field caused by the number of windings of the second loop coil 121 and the capacity of the second capacitor 122 (generation of electromagnetic field B).

That is, when holding up one face (for example rear face) of the housing of the radio communication terminal 100 into the electro magnetic field A radiated from the loop coil 211 of the radio reader/writer 200, the second resonant circuit 120 composed of the second loop coil 121 and the second capacitor 122 mounted on the one face side resonates with the magnetic field to re-radiate the received magnetic field (generation of electromagnetic field B). With this re-radiation, a snake path stronger than the case of no presence of the second resonant circuit is generated onto the metal plate of which the rear is in the state of the presence of the magnetic field generated around the second resonant circuit 120.

This strengthened snake path of the magnetic field increases the power induced at the first loop coil 111 composed of the con-contact IC unit mounted on the rear side of the metal plate and the radio communication terminal 100 can obtain the power roughly the same power as that when the other face (for example front face) of the housing of the radio communication terminal 100 is held up. As a result, a sufficient communication distance can be secured even when one face (for example rear face) of the housing with the first loop coil 111 composed of the non-contact IC unit incorporated in the radio communication terminal 100 mounted thereon is held up toward the loop coil 211 of the radio reader/writer 200.

As mentioned above, with mounting the first resonant circuit 110 composed of the first loop coil 111 and the capacitor 112 and the second resonant circuit 120 composed of the second loop coil 121 and the capacitor 122 onto the metal back face, when the rear side of the face of the first loop coil 111 connected to the non-contact IC 132 is held up in the electromagnetic field A radiated from the radio reader/writer 200, the second resonant circuit 120 composed of the second loop coil 121 and the second capacitor 122 resonates. Then, the second loop coil 121 generates a magnetic flux and brings it into a snake path toward the metal back face, and as a result, the radio communication terminal 100 amplifies the power generated from the first loop coil 111 and enables making the communication distance long.

Thereby, in the communication between the radio communication terminal 100 and the radio reader/writer 200, the radio communication terminal 100 can secure the stable communication by holding up the loop coil mounted thereon without regard to the front or rear of the loop coil face.

Hereinafter, the configuration examples 1-8 of the radio communication terminal 100 will be described.

Figure 2B:
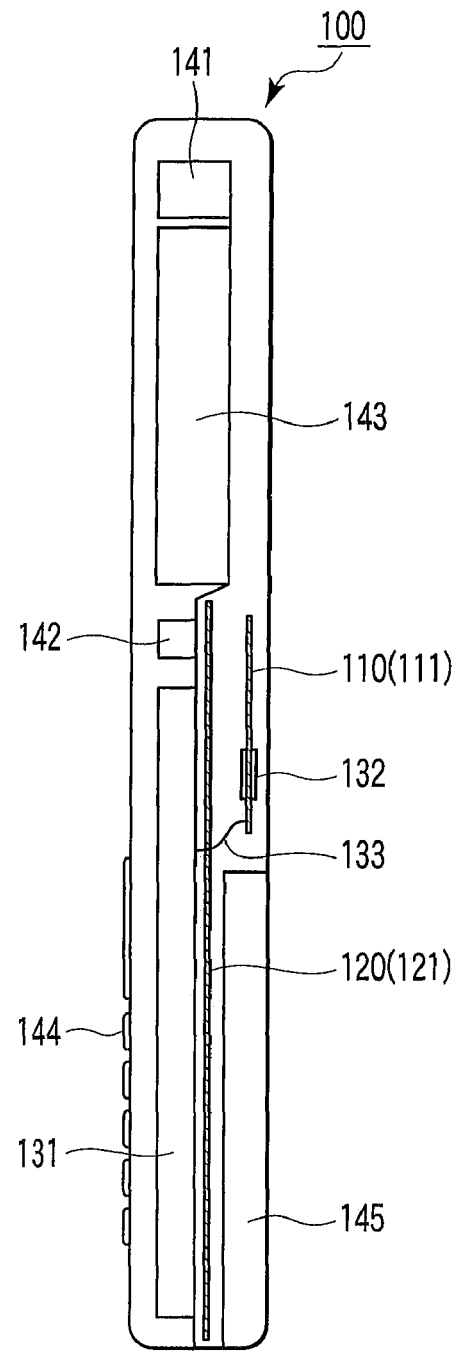
Figure 3A:
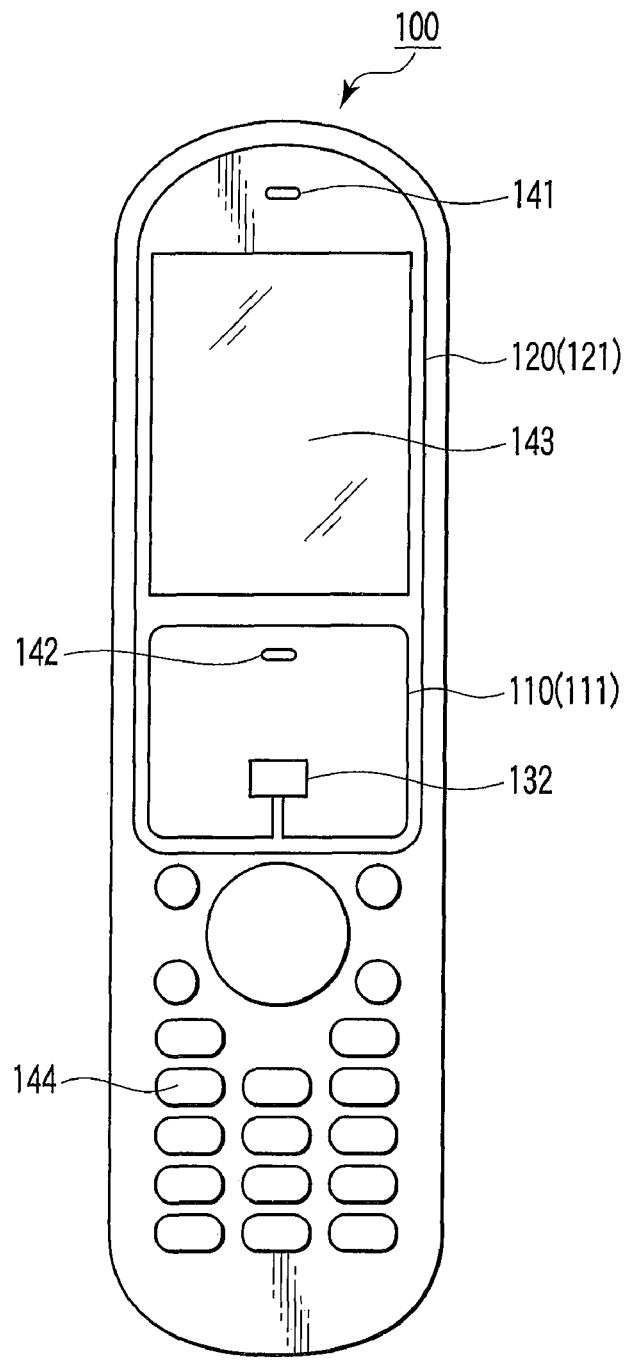
FIGS. 3A and 3B are views showing a configuration example 2 of the radio communication terminal.
Figure 3B:
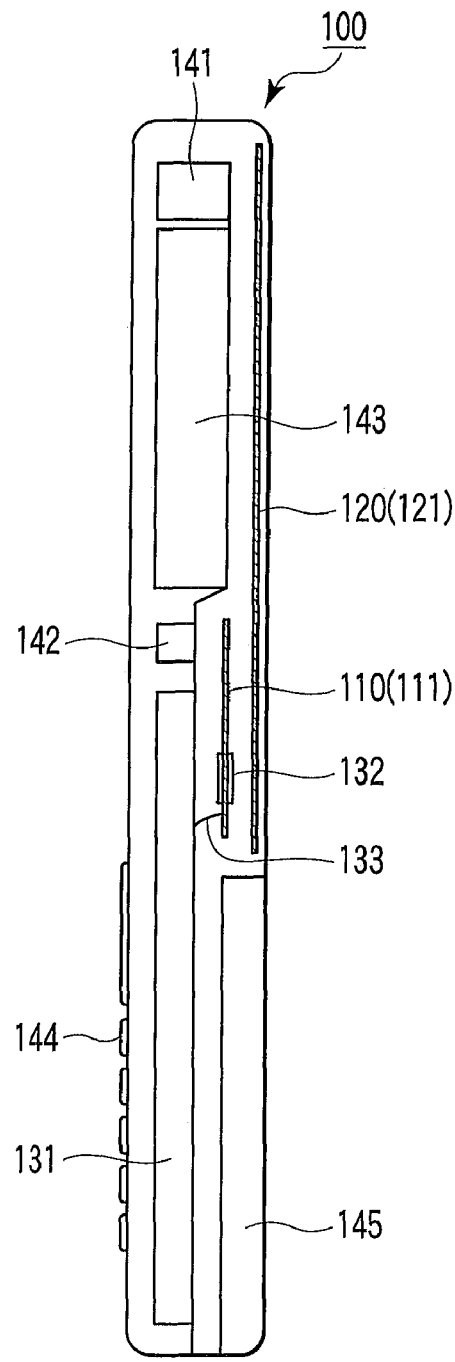
Figure 4A:
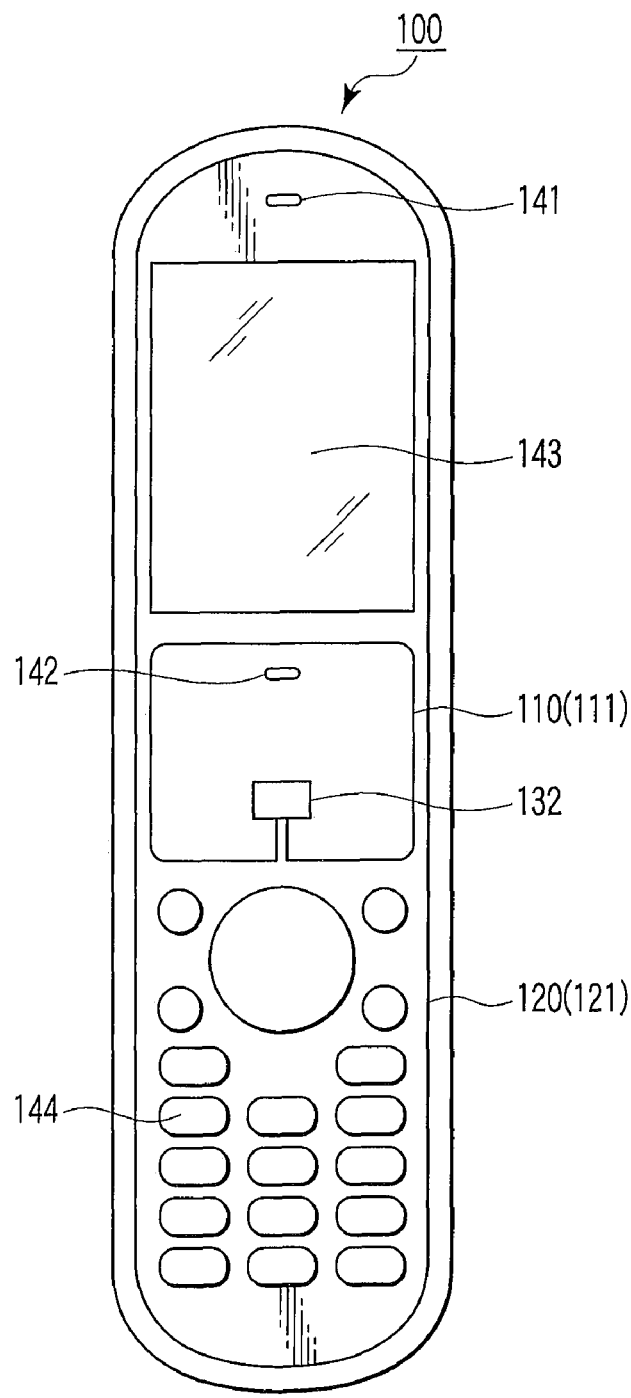
FIGS. 4A and 4B are views showing a configuration example 3 of the radio communication terminal.
Figure 4B:
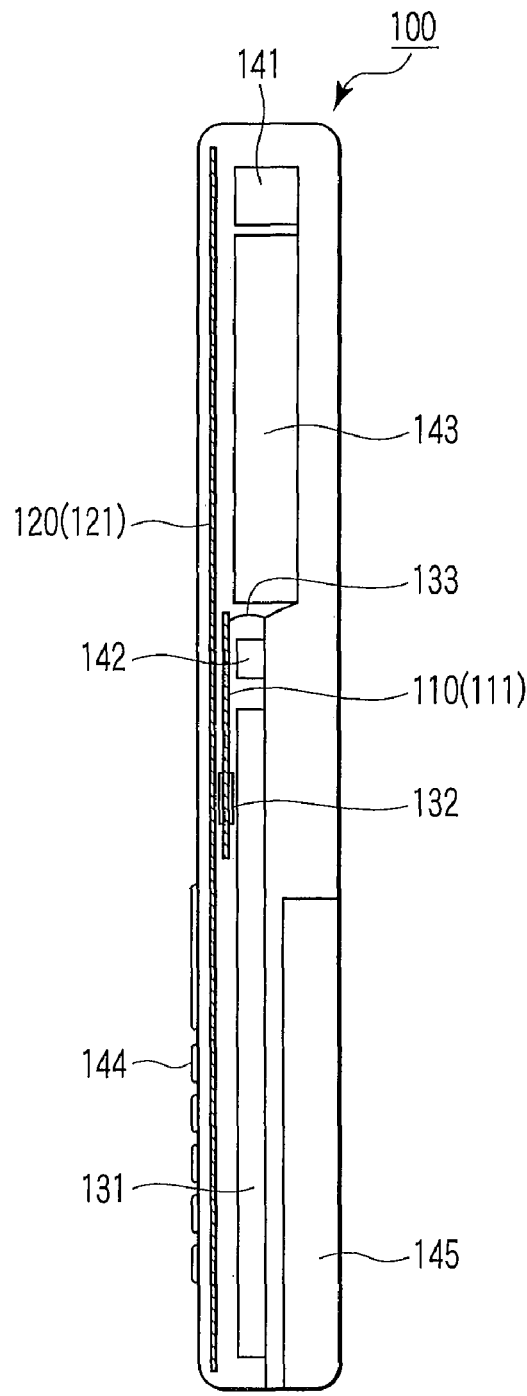

FIGS. 2A and 2B are the views showing the configuration example 1 of the radio communication terminal. FIGS. 3A and 3B are the views showing the configuration example 2 of the radio communication terminal. FIGS. 4A and 4B are the views showing the configuration example 3 of the radio communication terminal.

As shown in FIGS. 2A, 2B, 3A, 3B, 4A and 4B, the radio communication terminal 100 has the first resonant circuit 110, the second resonant circuit 120, the main control unit 131, the non-contact IC 132, the connecting line 133, a reception port 141, a transmission port 142, a liquid display 143, an operation button section 144, a buttery 145, and the like. As described above, the first resonant circuit 110 is composed of the first loop coil 111 and the first capacitor 112 for communication. One second resonant circuit 120 is composed of the second loop coil 121 and the second capacitor 122 for communication. The main control unit 131 and the battery 145 are shielded with the shielding member to prevent electromagnetic interference.

As shown in FIGS. 2A, 2B, 3A, 3B, 4A and 4B, the loop area formed by the second loop coil 121 is larger than that formed by the first loop coil 111. The second loop coil 121 is arranged at an outer circumference of the loop formed by the first loop coil 111. The second loop coil 121 is arranged so that the whole thereof is not hidden in a shadow of the shielding member. That is, at lest a part of the second loop coil 121 is projected from the shade of the shielding member. It is further preferable for the loop area formed by the second loop coil 121 is larger than the area of the shielding member. Thereby, even if the first resonant circuit 110 is disposed on one side of the shielding member of the main control unit 131, the power generated from the first loop coil 111 can be amplified by a resonant effect of the second resonant circuit 120. Accordingly, the holding up of any face of the radio communication terminal 100 toward the radio reader/writer 200 can establish the stable communication.

Furthermore, as shown in FIGS. 4A and 4B, with arrangement of the second loop coil 121 along with the outer circumference of the housing of the radio communication terminal 100, it can obtain a further effective resonant effect.

Figure 5:
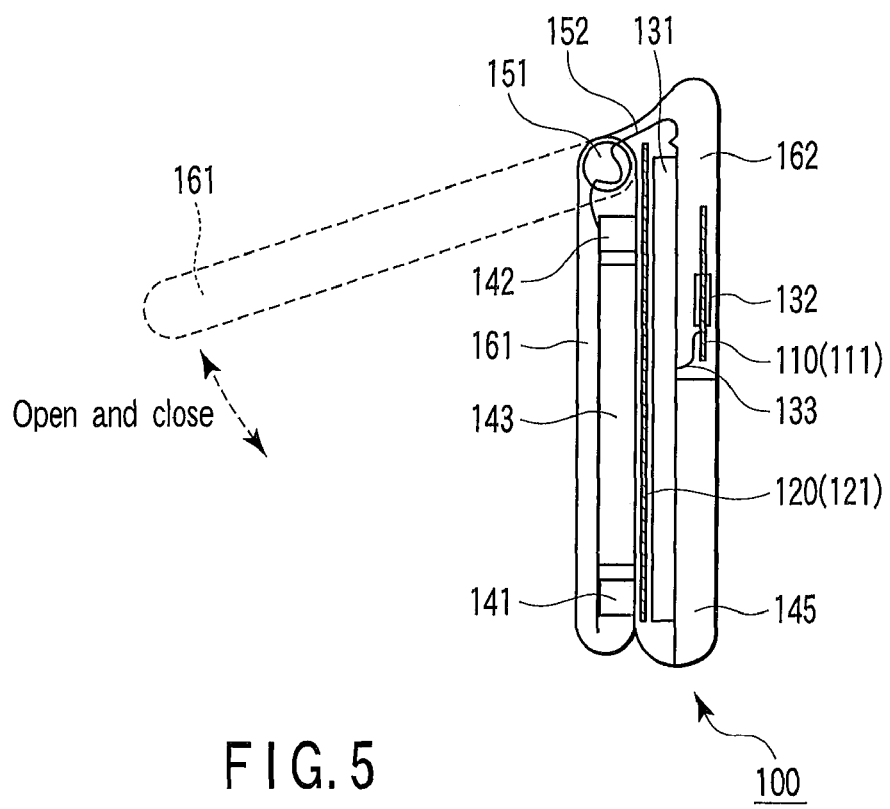
FIG. 5 is a view showing a configuration example 4 of the radio communication terminal.
Figure 6:
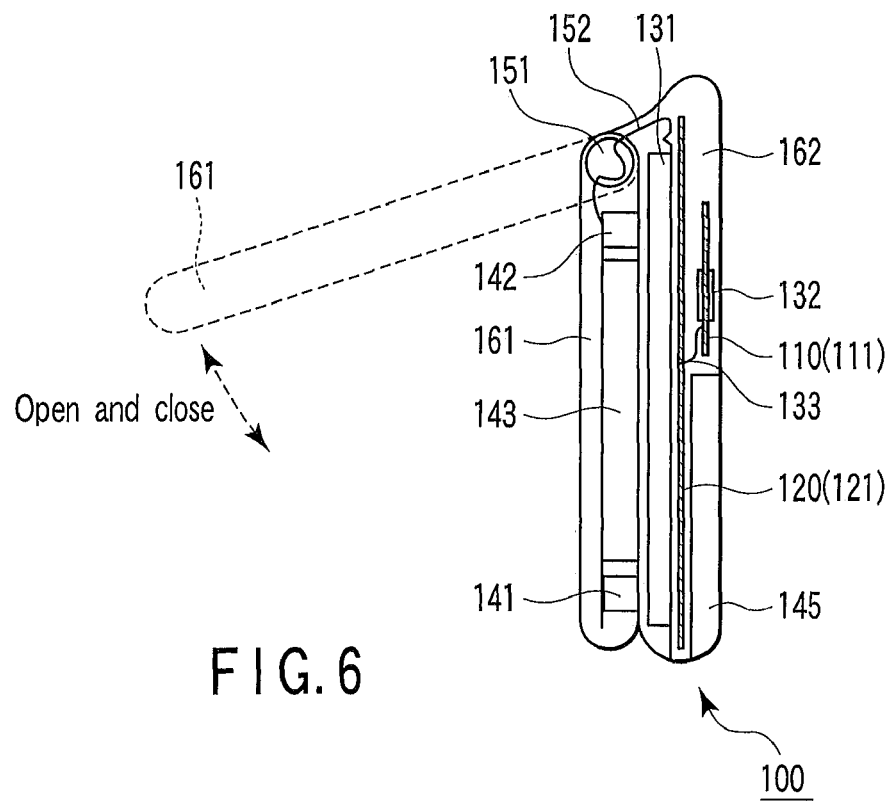
FIG. 6 is a view showing a configuration example 5 of the radio communication terminal.
Figure 7:
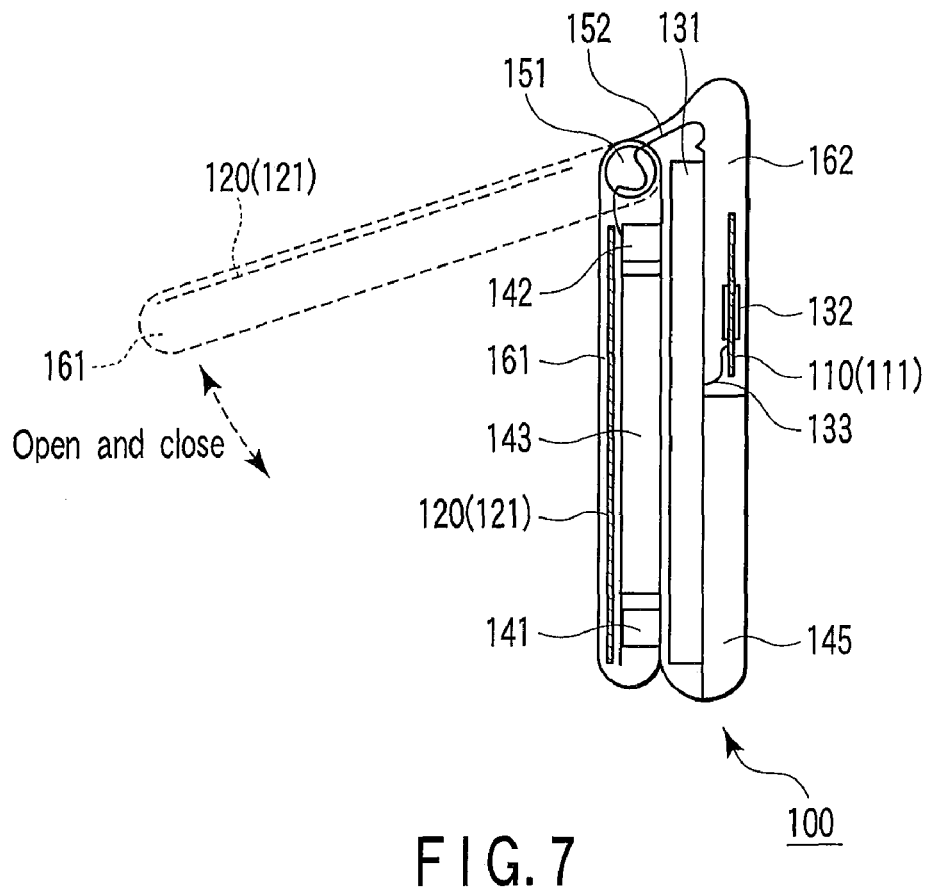
FIG. 7 is a view showing a configuration example 6 of the radio communication terminal.
Figure 8:
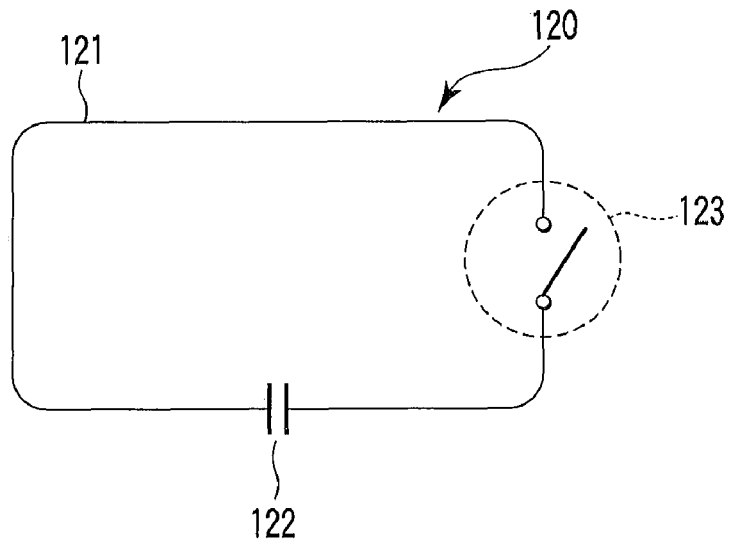
FIG. 8 is a view showing a configuration example of a second resonant circuit applicable to the configuration examples 4, 5 and 6 of the radio communication terminal.

FIG. 5 is the view showing the configuration example 4 of the ratio communication terminal. FIG. 6 is the view showing the configuration example 5 of the ratio communication terminal. FIG. 7 is the view showing the configuration example 6 of the ratio communication terminal. FIG. 8 is the view showing configuration example of the second resonant circuit 120 applicable to the configuration examples 4, 5 and 6 of these radio communication terminals.

As shown in FIGS. 5, 6 and 7, each of the radio communication terminal 100 has the first resonant circuit 110, the second resonant circuit 120, the main control unit 131, the con-contact IC 132, connecting line 133, the reception port 141, the transmission port 142, the liquid crystal display 143, the battery 145, a hinge 151 (movable section), a connector 152, a unit 161, a unit 162 and the like, respectively. As mentioned above, the first resonant circuit 110 is composed of the first loop coil 111 and the first capacitor 112 for communication. One second resonant circuit 120 is composed of the second loop coil 121 and the second capacitor 122 for communication. The main unit 131 and the battery 145 are shielded for preventing the electromagnetic interference.

The housing of the radio communication terminal 100 is composed of the first unit 161 and the second unit 162 connected with each other through the hinge 151. For example, the housing of the radio communication terminal 100 is configured to enable folding the first unit 161 and the second unit 162 using the hinge 151 as the base point. Or, the housing of the radio communication terminal 100 is configured to make the first unit 161 be freely rotatable (slidable) to the second unit 162. The connector 152 connects the electronic device (for example, main control unit 131) of the first unit 161 to the electronic device (for example, liquid crystal display 143).

As shown in FIGS. 5, 6 and 7, the loop area formed by the second loop coil 121 is larger than that formed by the first loop coil 111. The second loop coil 121 is arranged at an outer circumference of the loop formed by the first loop coil 111. The second loop coil 121 is arranged so that the whole thereof is not hidden in the shadow of the shielding member. That is, at lest a part of the second loop coil 121 is projected from the shade of the shielding member. It is further preferable for the loop area formed by the second loop coil 121 is larger than the area of the shielding member.

As shown in FIG. 5, even if the first resonant circuit 110 is disposed on one side with an interposition of the shielding member of the main control unit 131 in the second unit 162, and even if the second resonant circuit 120 is disposed on the other side with an interposition of the shielding member of the main control unit 131 in the second unit 162, the power generated from the first loop coil 111 can be amplified by a resonant effect of the second resonant circuit 120. Accordingly, the holding up of any face of the radio communication terminal 100 in either state in which the radio communication terminal 100 is folded or folded with a slide rotation toward the radio reader/writer 200 can achieve the stable communication.

And as shown in FIG. 6, even if the first resonant circuit 110 is disposed on one side with the interposition of the shielding member of the main control unit 131 of the second unit 162, and even if the second resonant circuit 120 is disposed on the same side, the power generated from the first loop coil 111 can be amplified by the resonant effect of the second resonant circuit 120. Accordingly, the holding up of any face of the radio communication terminal 100 in either state in which the radio communication terminal 100 is folded or folded with the slide rotation toward the radio reader/writer 200 can achieve the stable communication.

And as shown in FIG. 7, even if the first resonant circuit 110 is disposed on one side with an interposition of the shielding member of the main control unit 131 of the second unit 162, and even if the second resonant circuit 120 is disposed on the other side with the interposition of the shielding member of the liquid crystal display in the first unit 161, the power generated from the first loop coil 111 can be amplified by the resonant effect of the second resonant circuit 120. Accordingly, the holding up of any face of the radio communication terminal 100 in either state in which the radio communication terminal 100 is folded or folded with the slide rotation toward the radio reader/writer 200 can achieve the stable communication.

As shown in FIG. 8, the second loop coil 121 has a switch 123 to open and close the loop with linkage (synchronization) with a movement of the hinge 151. Thereby, in the state of folding the radio communication terminal 100 or folding it with the slide rotation, the second loop coil 121 can exert the resonant effect of the second resonant circuit 120.

Figure 9:
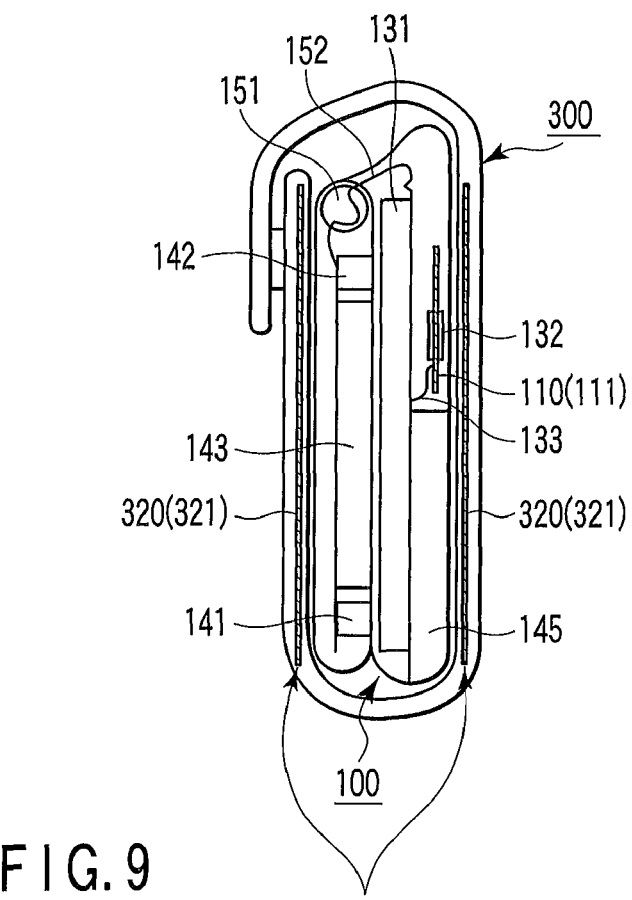
FIG. 9 is a view showing an example of a radio communication terminal housing case for housing the radio communication terminal.

FIG. 9 is the view showing the one example of the radio communication terminal housing case for housing the radio communication terminal. As shown in FIG. 9, the case 300 houses, for example, the radio communication terminals 100 (but, it may not provided with second resonant circuit 120) shown in FIGS. 5, 6 and 7. Each case 300 may be structured so as to enable housing the radio communication terminal 100

(but, may not provided with second resonant circuit 120) shown in FIGS. 2A, 2B, 3A, 3B, 4A and 4B, respectively. The case 300 has a second resonant circuit 320 composed of a second loop coil 321 resonating by the magnetic field from the radio reader/writer 200 of a communication partner of the radio communication terminal 100 together with the first loop coil 111 mounted thereon.

That is, when each case 300 houses the radio communication terminal 100 (but, may not provided with second resonant circuit 120) shown in FIGS. 5, 6 and 7, respectively, to hold up the case 300 toward the radio reader/writer 200, the radio communication terminal 100 can amplify the power generated from the first loop coil 111 thereof by the resonant effect from the second resonant circuit 320 in the case 300. Accordingly, the holding up of either face of the case 300 with the radio communication terminal 100 housed therein toward the radio reader/writer 200 can cause the stable communication.

Like this, the use of the case 300 can increase the loop area of the second loop coil 321 to exert further dramatic effect resulted from the resonant effect.

Figure 10:
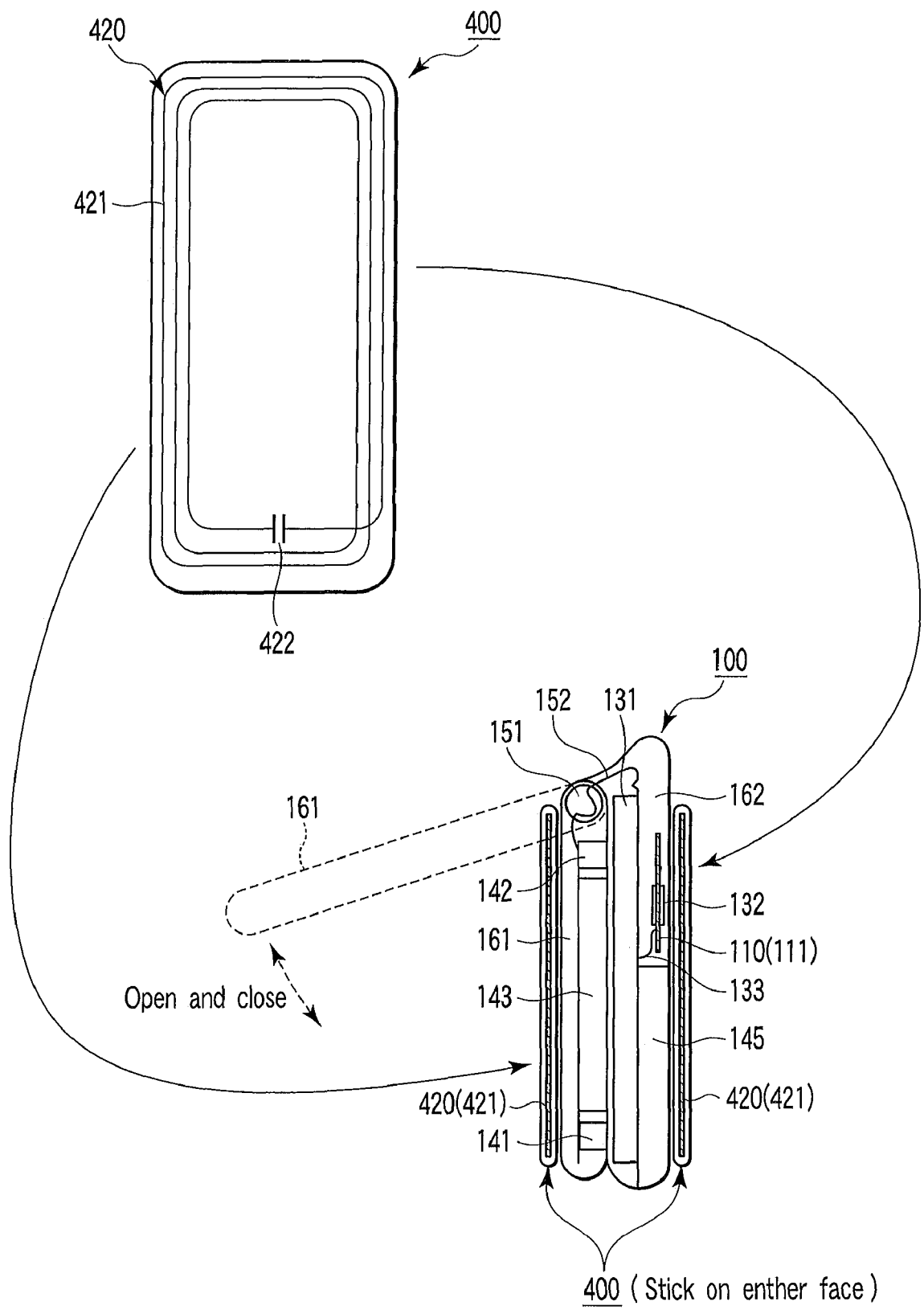
FIG. 10 is a view showing an example of a radio communication terminal sheet capable of being mounted (stuck) on the radio communication terminal.

FIG. 10 is the view showing one example of the radio communication terminal sheet capable of being mounted (stuck) to the radio communication terminal. As shown in FIG. 10, a radio communication terminal sheet 400 can be mounted to, for example, the radio communication terminals 100 (but, may not provided with second resonant circuit 120) shown in FIGS. 5, 6 and 7. The sheet 400 may be structured so as to be usable by being mounted to the radio communication terminals 100 (but, may not provided with second resonant circuit 120) shown in FIGS. 2A, 2B, 3A, 3B, 4A and 4B. This sheet 400 has a second resonant circuit 420 composed of a second loop coil 421 and a second capacitor 422 resonating together with the first loop coil 111 mounted on the radio communication terminal 100 by the magnetic field from the radio reader/writer 200 of the communication partner of the radio communication terminal 100. This loop coil 421 may be formed by printing, wiring or etching. The second capacitor 422 may be an actual component and also one made by pattern printing. The central section of the sheet 400, in other words, an inside section of the second loop coil 421 may be a hollow. And the sheet 400 is made of a material not to shield the electromagnetic field.

Otherwise stated, by mounting the sheet 400 to one face of the radio communication terminal 100 (but, may not provided with second resonant circuit 120) in the state of folding or folding with a slide rotation thereof, the radio communication terminal 100 can amplify the power generated form the first loop coil 111 thereof by the resonant effect of the second resonant circuit 420 of the sheet 400. Accordingly, the holding up of any face of the radio communication terminal 100 with the sheet 400 mounted thereto toward the radio reader/writer 200 can achieve the stable communication.

As described above, by utilizing the sheet 400, the radio communication terminal 100 can increase the loop area of the second loop coil 421 to obtain the great effect resulted from the resonant effect.

Figure 11:
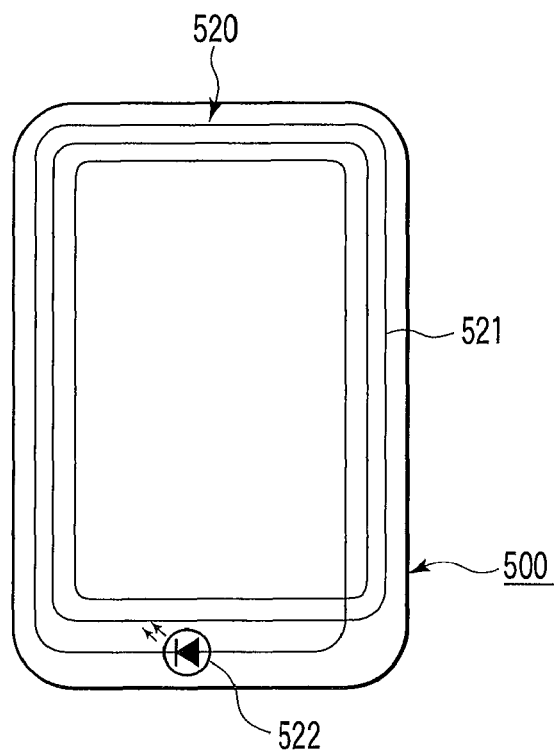
FIG. 11 is a view showing an example of a radio communication terminal display device capable of being mounted (stuck) on the radio communication terminal.

FIG. 11 is the view showing one example of the radio communication terminal display device capable of being mounted (stuck) to the radio communication terminal. As shown in FIG. 11, a display device 500 can be mounted to, for example, the radio communication terminal 100 (but, may not provided with second resonant circuit 120) shown in FIGS. 2A, 2B, 3A, 3B, 4A, 4B, 5, 6 and 7. The display device 500 has a second resonant circuit 520 composed of a second loop coil 521 resonating together with the first loop coil 111 mounted on the radio communication terminal 100 by the magnetic field from the radio reader/writer 200 of the communication partner of the radio communication terminal 100. Furthermore, the second loop coil 521 is provided with display means such as a light emitting diode. This loop coil 521 maybe formed by printing, wiring or etching. The central section of the display device 500, in other words, the inside section of the second loop coil 521 may be a hollow. The display device 500 is made of a material not shielding the electromagnetic field.

That is to say, when mounting the display device 500 to the radio communication terminal 100 (but, may not provided with second resonant circuit 120) to hold up the radio communication terminal 100 with the display device 500 attached thereto toward the radio reader/writer 200, the radio communication terminal 100 can amplify the power generated form the first loop coil 111 thereof by the resonant effect of the second resonant circuit 520 of the display device 500. Accordingly, the holding up of any face of the radio communication terminal 100 with the display device 500 mounted thereto toward the radio reader/writer 200 can achieve the stable communication. As described above, by utilizing the display device 500, the radio communication terminal 100 can increase the loop area of the second loop coil 521 to obtain the great effect resulted from the resonant effect. Moreover, a light emitting diode 522 provided with the second loop coil 521 of the display device 500 emits light by receiving the magnetic field from the radio reader/writer 200. Thereby, the display sheet 500 can guide the communication status. For example, in response to the light emitting state of the diode 522, the radio communication terminal 100 can maintain further excellent communication state by approximating it to the radio reader/writer 200.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication terminal provided in a housing and being electronically shielded to prevent electromagnetic interference, the radio communication terminal comprising:
   an integrated circuit;
   a first resonant circuit connected to the integrated circuit to make non-contact communication with an external device, the first resonant circuit comprising a first loop coil; and
   a second resonant circuit resonating with the first resonant circuit, the second resonant circuit comprising a second loop coil, and the second resonant circuit not being electrically connected to the first resonant circuit,
   wherein the second loop coil has a loop area larger than the first loop coil and the second loop coil is arranged at an outer circumference of the first loop coil,
   the first loop coil is positioned on one side of the radio communication terminal,
   the second loop coil is positioned on the other side of the radio communication terminal,
   an electronic shielding member is interposed between the first and second loop coils, and
   the loop area is larger than the electronic shielding member.

2. The radio communication terminal according to claim 1, wherein the second loop coil is arranged along an outer circumference of the housing of the radio communication terminal.

3. The radio communication terminal according to claim 1, wherein
the housing is composed of two units connected together via a movable section, and
the first and second loop coils are arranged in one of the two units.

4. The radio communication terminal according to claim 1 wherein
the housing is composed of two units connected together via a movable section,
the first loop coil is arranged in one of the two units, and the second loop coil is arranged in the other of the two units.

5. The radio communication terminal according to claim 4, wherein the second resonant circuit includes a switch for opening and closing the second resonant circuit by linking with a movement of the movable section.

6. The radio communication terminal according to claim 1, wherein the second loop is arranged so that a center of the second loop coil approaches a center of the first loop coil.

7. A radio communication terminal housing, comprising:
a second resonant circuit resonating with a first resonant circuit, the second resonant circuit comprising a second loop coil, and the second resonant circuit not being electrically connected to the first resonant circuit, and
a radio communication terminal incorporated in the housing and including:
an integrated circuit; and
the first resonant circuit connected to the integrated circuit to make non-contact communication with an external device, the first resonant circuit comprising a first loop coil;
wherein the second loop coil has a loop area larger than the first loop coil and the second loop coil is arranged at an outer circumference of the first loop coil,
the first loop coil is positioned on one side of the radio communication terminal,
the second loop coil is positioned on the other side of the radio communication terminal,
an electronic shielding member is interposed between the first and second loop coils, and
the loop area is larger than the electronic shielding member.

8. A radio communication terminal sheet, comprising:
a second resonant circuit resonating with a first resonant circuit, the second resonant circuit comprising a second loop coil, and the second resonant circuit not being electrically connected to the first resonant circuit, and
a radio communication terminal having the terminal sheet mounted thereto and including:
an integrated circuit; and
the first resonant circuit connected to the integrated circuit to make non-contact communication with an external device, the first resonant circuit comprising a first loop coil;
wherein the second loop coil has a loop area larger than the first loop coil and the second loop coil is arranged at an outer circumference of the first loop coil,
the first loop coil is positioned on one side of the radio communication terminal,
the second loop is positioned on the other side of the radio communication terminal,
an electronic shielding member is interposed between the first and second loop coils, and
the loop area is larger than the electronic shielding member.

9. A radio communication terminal display device, comprising:
a second resonant circuit resonating with a first resonant circuit, the second resonant circuit comprising a second loop coil, and the second resonant circuit not being electrically connected to the first resonant circuit, and
a radio communication terminal having the terminal display device mounted thereto and including:
an integrated circuit; and
the first resonant circuit connected to the integrated circuit to make non-contact communication with an external device, the first resonant circuit comprising a first loop coil;
wherein the second loop coil has a loop area larger than the first loop coil and the second loop coil is arranged at an outer circumference of the first loop coil,
the first loop coil is positioned on one side of the radio communication terminal,
the second loop coil is positioned on the other side of the radio communication terminal,
an electronic shielding member is interposed between the first and second loop coils, and
the loop area is larger than the electronic shielding member.

10. The radio communication terminal according to claim 1, wherein at least a part of the second loop coil is projected from a shade of the electronic shielding member.

* * * * *

UNITED STATES PATENT AND TRADEMARK OFFICE
CERTIFICATE OF CORRECTION

PATENT NO. : 7,865,214 B2
APPLICATION NO. : 12/210544
DATED : January 4, 2011
INVENTOR(S) : Kushima Page 1 of 1

It is certified that error appears in the above-identified patent and that said Letters Patent is hereby corrected as shown below:

On title page, item (63) Related U.S. Application Data, includes

--Continuation of PCT/JP2007/000986, filed September 10, 2007--

On title page, item (30) Foreign Application Priority Data, includes

--March 29, 2007     JP................2007-087191
  September 14, 2006   JP................2006-249913--

Signed and Sealed this
Third Day of May, 2011

David J. Kappos
*Director of the United States Patent and Trademark Office*